United States Patent [19]

Okada et al.

[11] Patent Number: 5,113,476
[45] Date of Patent: May 12, 1992

[54] LIGHT ATTENUATOR AND PROCESS FOR FABRICATION THEREOF

[75] Inventors: Hiroshi Okada, Tokyo; Shingo Suzuki, Zama; Manabu Kagami, Kawasaki; Chiaki Suematsu, Tokyo, all of Japan

[73] Assignee: Mitsubishi Rayon Company Ltd., Tokyo, Japan

[21] Appl. No.: 610,697

[22] Filed: Nov. 8, 1990

[51] Int. Cl.$^5$ ............................................. G02B 6/36
[52] U.S. Cl. ....................................... 385/140; 385/78
[58] Field of Search ................ 350/96.2, 96.21, 96.15, 350/96.29; 156/249; 385/140, 144, 141, 145

[56] References Cited

U.S. PATENT DOCUMENTS

| | | | |
|---|---|---|---|
| 4,461,539 | 7/1984 | Bailey et al. | 350/96.21 |
| 4,477,146 | 10/1984 | Bowen et al. | 350/96.21 |
| 4,639,078 | 1/1987 | Sheem | 350/96.21 |
| 4,666,243 | 5/1987 | Rogstradius et al. | 350/96.21 |
| 4,925,514 | 5/1990 | Okada et al. | 350/96.15 X |

Primary Examiner—John D. Lee
Assistant Examiner—John Ngo
Attorney, Agent, or Firm—Oblon, Spivak, McClelland, Maier & Neustadt

[57] ABSTRACT

Disclosed is a light attenuator comprising a stick or rod composed of a light-transmitting material, and a light-attenuating layer composed of a thermoplastic resin and formed on at least one end face of the stick or rod, wherein finely divided particles having a light-absorbing or light-scattering property are uniformly incorporated in the thermoplastic resin. This light attenuator is made by forming a light-attenuating thermoplastic resin layer having incorporated therein the light-absorbing or light scattering finely divided particles on a release film or paper; placing the light-attenuating layer formed on the release film or paper on a heating plate; press-bonding the end face of a rod or stick composed of a light-transmitting material inserted and set in a ferrule to the surface of the release film or paper; cooling the bonded assembly; and then peeling the release film or paper to transfer the light-attenuating layer to the end face of the light-transmitting rod or stick.

8 Claims, 5 Drawing Sheets

LIGHT ATTENUATOR AND PROCESS FOR FABRICATION THEREOF

BACKGROUND OF THE INVENTION

(1) Field of the Invention

The present invention relates to a small-size lightweight light attenuator to be used for adjustment of the quantity of light in a light transmission line, measurement of the light transmission characteristics and other tests, and to a process for the fabrication of this light attenuator.

(2) Description of the Related Art

As the conventional light attenuator arranged in a light transmission line composed of optical fibers, the light attenuators shown in FIGS. 10 through 12 are known.

In the light attenuator shown in FIG. 10, an optical fiber 91 is arranged on the central axis of a ferrule 93 to construct a light connector plug and an optical fiber 92 is arranged on the central axis of a ferrule 94 to construct another light connector plug, both ferrules 93 and 94 are arranged within a sleeve 95 while confronting each other, and lenses 96 and 97 for adjusting the optical axis and a light-attenuating element (such as a filter) 98 are arranged between the ferrules 93 and 94.

In the light attenuator shown in FIG. 11, an optical fiber 101 is arranged on the central axis of a ferrule 103 to construct a light connector plug, and an optical fiber 102 is arranged on the central axis of a ferrule 104 to construct another light connector plug, both ferrules 103 and 104 are arranged within a sleeve 105 while confronting each other, and a cylindrical member 108 having an optical fiber rod 107 arranged on the central axis thereof is interposed between the ferrules 103 and 104. An inclined face is formed on one end face of the cylindrical member 108, and a light-attenuating film 106 composed of a vacuum-deposited metal film is formed on this inclined face. The light attenuator of this type is illustrated, for example, in Japanese Unexamined Patent Publication No. 59-79402.

In the light attenuator shown in FIG. 12, a light-attenuating film 113 composed of a vacuum-deposited metal film is formed on the end face of one of optical fibers 111 and 112 arranged to confront each other, and the end faces of the confronting optical fibers are fusion-bonded to each other by arc discharge generated by electrodes 114 and 115. The light attenuator of this type is illustrated, for example, in Japanese Unexamined Patent Publication No. 55-79402.

Nevertheless, a high degree of skill and experience is necessary for the fabrication of these conventional light attenuators, and moreover a large-scale equipment is required for such a fabrication. Accordingly, these conventional techniques disadvantageous in that it is very difficult or impossible to increase the operation efficiency or carry out a mass production thereof.

SUMMARY OF THE INVENTION

The primary object of the present invention is to provide a small-size and cheap light attenuator having an excellent operation efficiency and capable of being mass-produced, by eliminating the foregoing disadvantages of the conventional techniques, and a process for the fabrication of this light attenuator.

In one aspect of the present invention, there is provided a light attenuator comprising a stick or rod composed of a light-transmitting material, and a light-attenuating layer composed of a thermoplastic resin and formed on at least one end face of the stick or rod, wherein finely divided particles having a light-absorbing or light-scattering property are uniformly incorporated in the thermoplastic resin.

In another aspect of the present invention, there is provided a process for the fabrication of a light attenuator, which comprises forming a light-attenuating layer composed of a thermoplastic resin, in which finely divided particles having a light-absorbing or light-scattering property are uniformly incorporated, on a release film or paper; placing the light-attenuating layer formed on the release film or paper on a heating plate; press-bonding the end face of a rod or stick composed of a light-transmitting material inserted and set in the interior of a ferrule to the surface of the release film or paper; cooling the bonded assembly; and then peeling the release film or paper to transfer the light-attenuating layer to the end face of the light-transmitting rod or stick.

DESCRIPTION OF THE PREFERRED EMBODIMENTS

Figure 1:
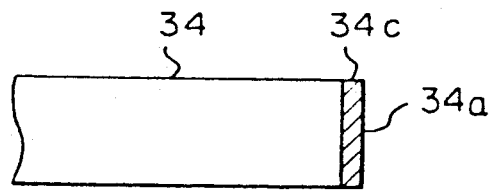
FIG. 1 is a sectional view showing an end portion of a light-transmitting stick or rod of the light attenuator of the present invention.

Referring to FIG. 1 illustrating the end portion of a light-transmitting stick or rod of the light attenuator of the present invention a light-attenuating layer 34c comprising a thermoplastic resin layer in which finely divided particles having a light-absorbing or light-scattering property and preferably a particle diameter of at least 50 nm are uniformly incorporated is formed on one end 34a of a rod or stick 34 composed of a light-transmitting material.

Figure 2A:
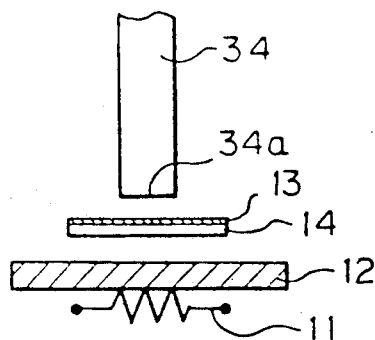
FIG. 2A through 2D are a diagram illustrating an embodiment of the process for the fabrication of the light attenuator of the present invention.
Figure 2B:
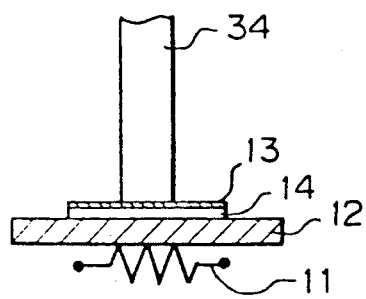
Figure 2C:
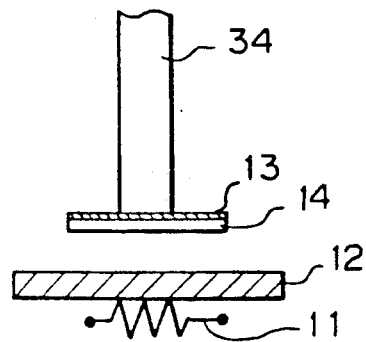
Figure 2D:
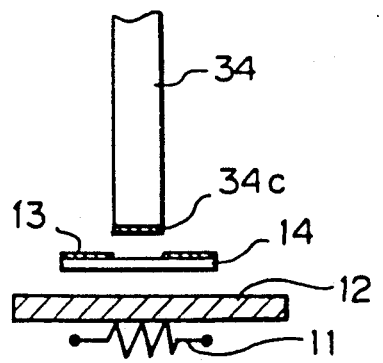

An example of the process for the fabrication of the light attenuator of the present invention is diagrammatically illustrated in FIG. 2A through FIG. 2D. In FIG. 2A, reference numeral 34 represents a stick or rod composed of a light-transmitting material, on one end face 34a of which a light-attenuating layer 34c is formed. As the light-transmitting material, there can be mentioned, for example, polymethyl methacrylate, polystyrene and polycarbonate. Note, an optical fiber also can be used as the light-transmitting material. Preferably, the end face 34a of the stick or rod 14 composed of the light-transmitting material is mirror-polished, because this enables a light-attenuating layer having a uniform thickness to be formed on the mirror-polished end face 34 by the fabrication process described below. In FIG. 2A, reference numeral 13 represents a light-attenuating layer-forming layer, which consists of a thermoplastic resin film in which finely divided particles having a particle diameter of 50 nm to 1 μm are uniformly incorporated. This light-attenuating layer-forming film 13 is temporarily bonded to a transfer release film 14 composed, for example, of a polyester film or a release agent-coated release paper. Reference numeral 12 represents a heating plate, which is heated at a certain temperature by a heater 11 or in which heating and cooling are repeated according to a predetermined temperature cycle. As shown in FIG. 2B, the end face 34a of the rod or stick 34 composed of the light-transmitting material, the transfer release film 14 and the heating plate 12 are kept in contact for several seconds, and the thermally plasticized light-attenuating layer-forming film 13 is heat-transferred and fusion-bonded to the end face 34a of the stick or rod 34 composed of the light-transmitting material. Then, as shown in FIG. 2C, the heating plate 12 and heater 11 are separated from the transfer film 14, and the rod or stick 34 and the light-attenuating layer-forming film 13 are cooled, whereby the light-attenuating layer-forming film is bonded to the end face 34 of the rod or stick 34 composed of the light-transmitting material. Thereafter, the transfer film 14 is peeled from the rod or stick 34 and the superfluous portion of the light attenuating layer-forming film 13 is removed whereby the light-attenuating layer 34c is formed on the end face of the rod or stick. Thus, the light-transmitting stick or rod having the light attenuating layer on one end face thereof as shown in FIG. 1 is obtained.

Preferably, the thickness of the light-attenuating layer is several to about 200 μm. If the thickness of the light attenuating layer is smaller than 1 μm, the uniformity of the light-attenuating layer formed on the end face of the rod or stick is unsatisfactory, regardless of the content of the finely divided particles having a light-absorbing or light-scattering property, and it is difficult to obtain a light attenuator having the desired characteristics. If the thickness of the light-attenuating layer exceeds 200 μm, formation of the light-attenuating layer on the end face of the stick or rod by the transfer method becomes difficult.

A thermoplastic resin in which little thermal deformation occurs at a temperature where the optical fiber is used and the light-attenuating layer-forming film can be transferred to the end face of the stick or rod composed of the light-transmitting material by the heat transfer method at a transfer temperature not higher than 250° C., especially at a temperature of 150° to 200° C., is used as the thermoplastic resin for the formation of the light-attenuating layer. Preferably, an acrylic resin and a polyester resin are used, and a thermoplastic resin layer having a high transparency is especially preferred.

Finely divided particles having a light-absorbing property in a region of a wavelength smaller than 1,000 nm can be used as the particle uniformly incorporated in the thermoplastic resin layer, unless the heat resistance is much too low. For example, cationic dyes such as blue, red and black dyes and carbon black can be used.

Figure 3:
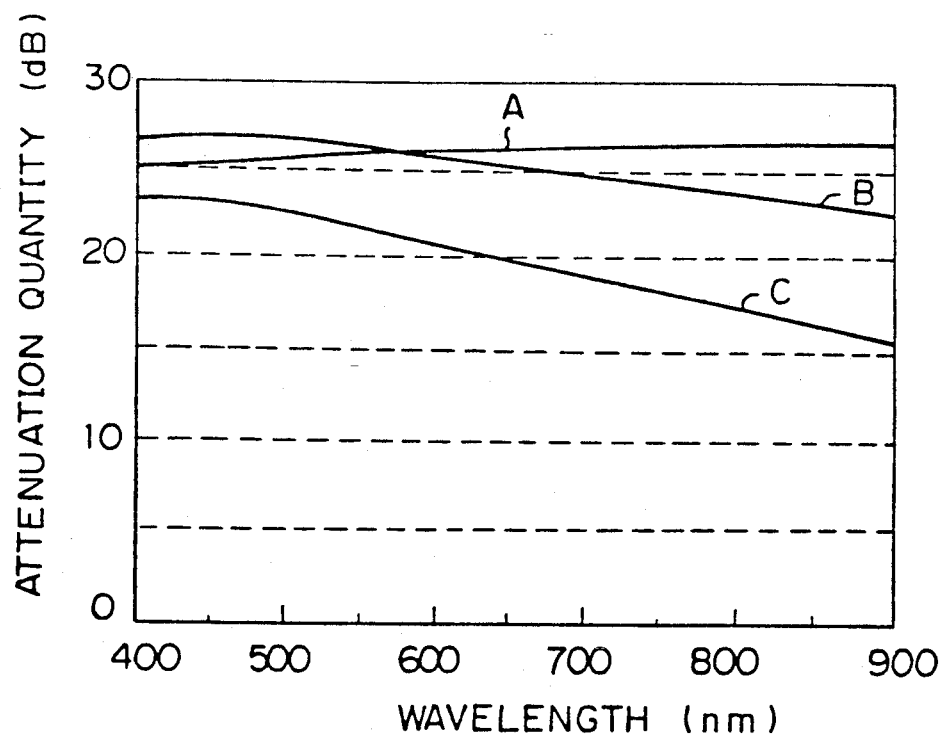
FIG. 3 shows the dependency of the light attenuation quantity upon the diameters of a light-adsorbing or light-scattering particles incorporated in a light-attenuating layer.

Preferably, the particle diameter of the particles having a light-absorbing or light-scattering property is at least 50 nm. In the light attenuator of the present invention comprising a light-attenuating layer containing finely divided particles having such a particle diameter, the wavelength dependency is reduced and the light attenuation characteristics are improved. In FIG. 3, characteristic curves A, B and C show the results obtained when the light attenuation quantities are measured at wave-lengths of 400 to 900 nm in light attenuators provided with light-attenuating layers of polymethyl methacrylate having a thickness of 12 μm, in which carbon black having particle diameters of 25, 50 and 95 nm is incorporated in amounts of 3% by weight, respectively.

From the results shown in FIG. 3 it is seen that, in the light attenuator provided with a light-attenuating layer containing carbon black having a particle diameter smaller than 50 nm, Rayleigh scattering occurs and the light attenuation quantity is lowered as the used wavelength is increased, that is, a wavelength dependency appears. In contrast, the attenuation characteristics of the light attenuator provided with a light-attenuating layer containing carbon black having a particle diameter of at least 50 nm shift from the μ-scattering region to the geometrical-optical scattering region, and therefore, satisfactory light attenuation characteristics having no wavelength dependency can be obtained.

The light attenuator of the present invention can be coupled with a receptacle through a connector plug attached to the top end of the rod or stick of the light-transmitting material having the light-attenuating layer.

Figure 4:
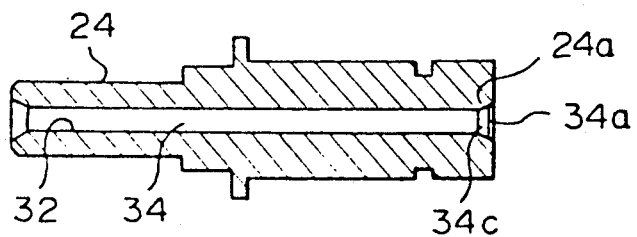
FIG. 4 is a sectional view showing the light attenuator of the present invention which is inserted and set in a ferrule.

FIG. 4 is a sectional view showing the light attenuator of the present invention when inserted and set in a ferrule 24. Chamfer portions 24a are formed on both ends of the ferrule 24. When the light-attenuating layer 34c is formed on the end face 34a of the rod 34 composed of the light-transmitting material by the above-mentioned method, when the rod 34 is inserted in the ferrule 24, the rod 34 is thermally expanded. The above-mentioned chamferred portions 24a are provided to absorb this thermal expansion of the rod 34. The light attenuator inserted and set in the ferrule 24 is inserted between a connector of an optical fiber cable and a receptacle provided with a light-projecting element and is used in the manner shown in any of FIGS. 5 through 9.

Figure 5:
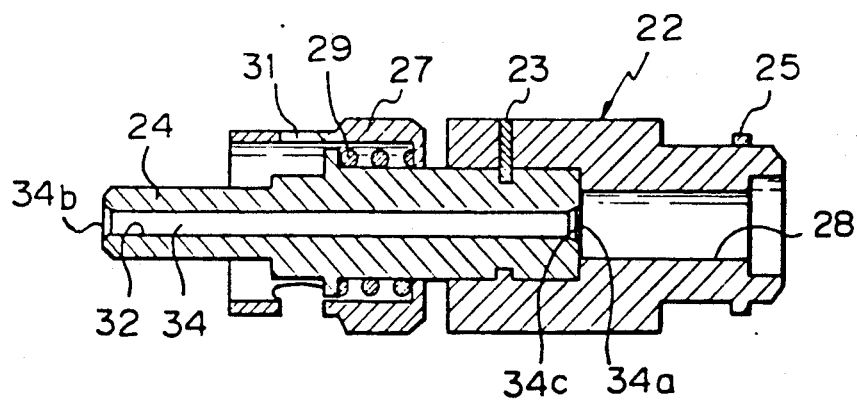
FIG. 5 is a sectional view illustrating an example of the application of the light attenuator of the present invention wherein the light attenuator is arranged between a connector plug and receptacle.

FIG. 5 is a sectional view showing a first example of the application of the light attenuator inserted and set in the ferrule (referred to as "light attenuator" hereinafter). Referring to FIG. 5, a connector plug connecting member (holder) 22 and a receptacle connecting member 27 are connected to the ferrule 24. The connector plug connecting member 22 is a cylinder having a certain length in the light-transmitting direction. A projection 25 for engagement with a bayonet type connector plug (not shown) is formed on the surface of the cylindrical connecting member 22 in the right half portion thereof, and a through hole 28 is formed in the interior of the cylindrical connecting member 22 to receive the optical fiber. The above-mentioned ferrule 24 is coupled and secured to the inner side of the connecting member 22 in the left half portion thereof through a pin 23. Namely, the connecting member 22 has a construction such that the optical axis of the light attenuator 34 is easily aligned with the optical axis of the optical fiber within the connector plug.

The receptacle connecting member 27 is a cylinder having a certain length in the light-transmitting direction, which is attached to the ferrule 24 so that the connecting member 27 can move in the light-transmitting direction. A slot 31 for the engagement with the projection of the receptacle is formed on the peripheral surface of the cylindrical connecting member 27. A compression coil spring 29 is arranged on the inner side of the connecting member 27 and on the outer surface of the ferrule 24, and the connecting member 27 is always urged to the right with respect to the receptacle by the coil spring 29, whereby the optical axis of the light-projecting element within the receptacle is precisely aligned with the optical axis of the light attenuator 34 and the optical axis of the optical fiber within the connector.

Figure 6:
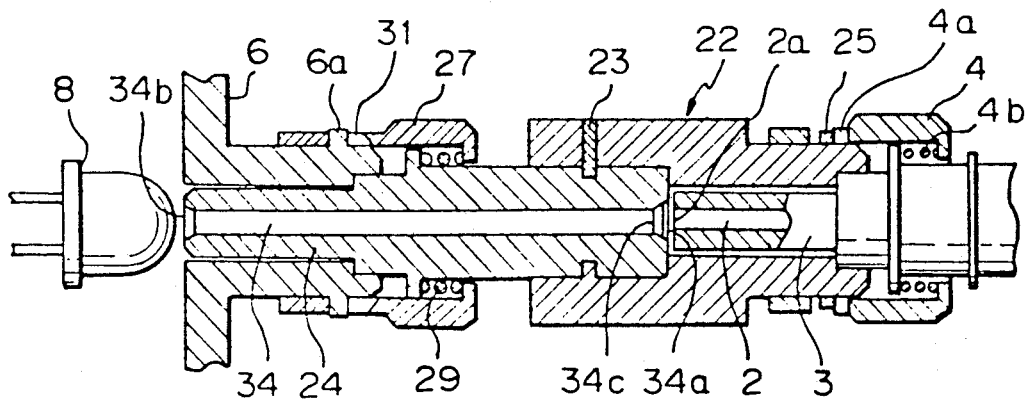
FIG. 6 through 9 are diagram illustrating other examples of the application of the light attenuator of the present invention.

FIG. 6 is a sectional view showing the light attenuator to which the connecting members shown in FIG. 5 are attached is arranged between a bayonet type connector plug 4 and a receptacle 6.

As shown in FIG. 6, the projection 25 of the connector plug connecting member 22 is engaged with a slot 4a of the connector plug 4, and the ferrule 3 of the optical fiber 2 is urged to the left by a coil spring 4b within the connector plug to impinge against the connecting member 22, whereby the positioning is effected. Preferably, the outer diameter and refractive index distribution of the optical fiber 2 are substantially equal to those of the light-transmitting stick or rod 34 of the light attenuator.

The light attenuator 34 is coupled with the receptacle 6 through the engagement between the slot 31 of the receptacle connecting member 27 and the projection 6a of the receptacle 6, and the ferrule 24 is urged to the left by the coil spring 29 within the connecting member 29 to impinge against the receptacle 6, whereby the positioning is effected.

As apparent from the foregoing illustration, the optical fiber 2 is received in the through hole 28 of the connecting member 22, and the optical fiber 2 is fixed so that the end face 2a of the optical fiber 2 is separated from one end face 34a of the rod or stick 34 in the ferrule 24 by a predetermined short distance, for example, 0.05 mm.

In the present embodiment having the above-mentioned structure, the light emitted from a light-projecting element 8 is incident on the light attenuator 34 from the end face 34b thereof and is transmitted through the interior of the rod or stick of the light-transmitting material, which constitutes the light attenuator. When the light which has been transmitted through the light attenuator 34 is emitted from the other end face 34a of the light attenuator 34, the light is attenuated by a predetermined quantity at the light-attenuating layer 34c. Then the light is incident on the optical fiber 2 from the end face 2a of the optical fiber 2 within the connector 4. Since the end face 34a of the light attenuator 34 is very close to the end face 2a of the optical fiber, the distribution pattern of the light incident in the optical fiber 2 is substantially equal to the light distribution pattern in the rod 34, and a constant light attenuation ratio can always be obtained. The end face 34a of the light attenuator 34 may be placed in contact with the end face 2a of the optical fiber 2.

In the present embodiment, the ferrule 24 is always urged toward the receptacle 6 by the coil spring 29 and the optical fiber 2 is always urged toward the connecting member 22 by the spring 4b, and the connecting member 22 is coupled with the ferrule 24. Accordingly, at the time of the attachment, the predetermined positional relationship can be maintained among the respective members, and even if an environmental change occurs, this positional relationship can be retained.

Figure 7:
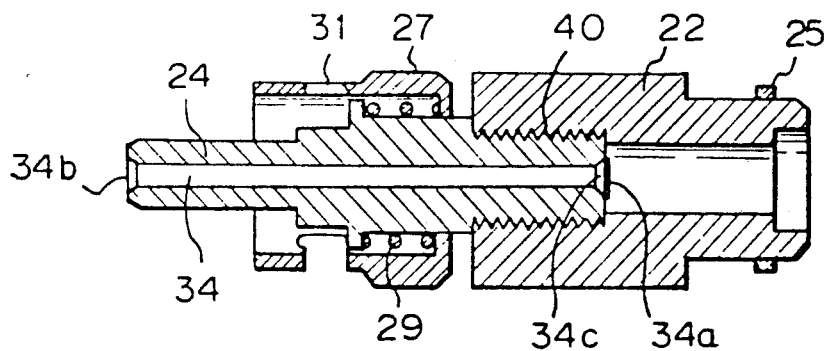
Figure 8:
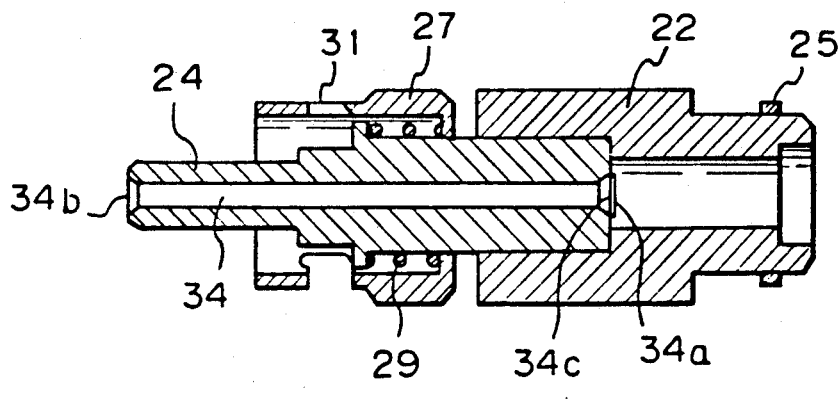
Figure 9:
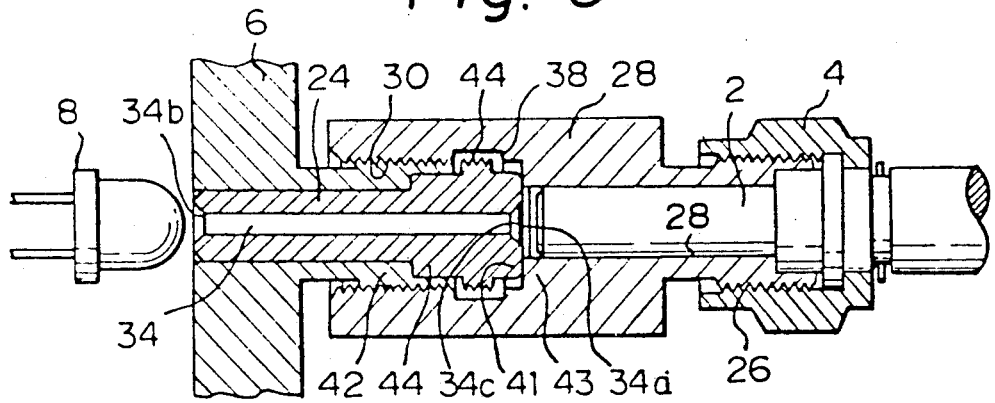
Figure 10:
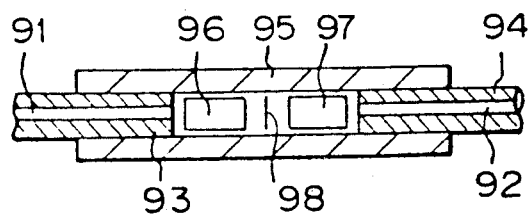
FIGS. 10 through 12 are sectional views illustrating the conventional light attenuators.
Figure 11:
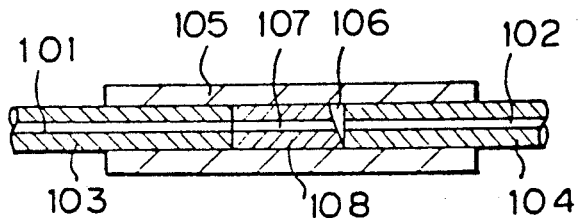
Figure 12:
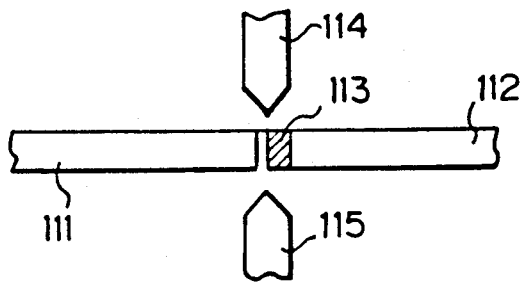

FIGS. 7, 8 and 9 are sectional views illustrating second, third, and fourth examples of the application of the light attenuator of the present invention, respectively. These figures correspond to FIG. 5, and in these figures, the same members as those in FIG. 5 are represented by the same reference numerals as used in FIG. 5.

The embodiment shown in FIG. 7 is different from the embodiment shown in FIG. 5 only in that the connecting member 22 is coupled to the ferrule 24 through a screw 40.

The embodiment shown in FIG. 8 is different from the embodiment shown in FIG. 5 only in that the connecting member 22 is coupled by press-fitting to the ferrule 24.

In the embodiment illustrated in FIG. 9, the receptacle connecting member and the connector plug connecting member, shown in FIG. 5, are integrated with each other to construct a connecting member 28. This connecting member 28 and the light attenuator 34 are combined and secured between the connector plug 4 of the SMA type and the receptacle 6. A male thread 26 having the same thread characteristics as those of a female thread of the connector plug 4 of the SMA type is formed on the right half portion of this connecting member 28, and the connector plug 4 is screwed with the male thread 26. A female thread 30 having the same thread characteristics as those of the male thread of the receptacle 6 is formed on the inner face of the left half portion of the connecting member 28. On the right side of the female thread 30, a cavity 38 having a diameter larger than that of the female thread 30 is formed on the inner face of the connecting member 28. A male screw 44 corresponding to the female thread 30 of the connecting member 28 is formed on the ferrule 24 of the light attenuator. The ferrule 24 of the light attenuator is inserted in the receptacle 6 and is set so that the female thread 30 of the connecting member 28 is fitted and screwed onto the male thread of the receptacle 6, and left and right shoulders 44 and 41 of the ferrule 24 are supported by a step 42 on the top end portion of the receptacle 6 and a step 43 in the connecting member 28, respectively.

The same effects as obtained in the first embodiment can be obtained in these second, third, and fourth embodiments.

In the foregoing embodiments, the light attenuator is inserted between the light-projecting element 8 and the optical fiber 2, but the present invention includes a modification in which a light-receiving element is arranged at the position of the light-projecting element 8 in FIG. 6 and FIG. 9 and the light is incident from the side of the optical fiber 2, and another modification in which the light attenuator is arranged between optical fibers.

As apparent from the foregoing description, in the light attenuator of the present invention, the light-attenuating layer is formed on the end face of the rod or stick composed of the light-transmitting material by a fusion bonding utilizing the heat transfer method, and therefore, the light attenuation quantity can be optionally controlled, and since the attenuation is effected by the film layer, the light attenuator has no mode dependency.

The light-attenuating film layer is formed on at least one end face of the rod or stick composed of the light-transmitting material having characteristics equivalent to those of an optical fiber aligned on a light transmission line, and this rod or stick is inserted and set in the ferrule and the connector plug connecting member and the receptacle connecting member are integrally coupled with the outer portion of the ferrule. Accordingly, the light attenuator can be attached without a delicate adjustment requiring a high degree of skill, and a predetermined attenuation ratio can be always obtained.

We claim:

1. A light attenuator comprising a stick or rod composed of a light-transmitting material of polymethylmethacrylate, polystyrene or polycarbonate, and a light-attenuating layer composed of a thermoplastic resin and formed on at least one end face of the stick or rod, wherein finely divided particles having a light-absorbing or light-scattering property are uniformly incorporated in the thermoplastic resin.

2. A light attenuator as set forth in claim 1, which is inserted and set in a ferrule and arranged between a connector plug of a light transmission line of an optical fiber and a receptacle for the connector plug.

3. A light attenuator as set forth in claim 2, wherein the ferrule is integrally coupled with the receptacle and the connector plug through a connecting member attached to the outside of the ferrule.

4. A light attenuator as set forth in claim 1, wherein the light-attenuating layer is bonded to the end face of the stick or rod composed of the light-transmitting material by heat transfer.

5. The light attenuator of claim 1, wherein said light-transmitting material of said attenuator is an optical fiber.

6. The light attenuator of claim 1, wherein the thermoplastic resin formed on said at least one end face said stick or rod is an acrylic resin or a polyester resin.

7. The light attenuator of claim 1, wherein said finely divided particles have a particle size diameter ranging from 50 nm to 1 $\mu$m.

8. The light attenuator of claim 1, wherein the thickness of said light-attenuating layer ranges from several $\mu$m to about 200 $\mu$m.

* * * * *